(12) United States Patent
Srinivasan

(10) Patent No.: US 6,865,122 B2
(45) Date of Patent: Mar. 8, 2005

(54) RECLAIMING BLOCKS IN A BLOCK-ALTERABLE MEMORY

(75) Inventor: Sujaya Srinivasan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 10/412,156

(22) Filed: Apr. 11, 2003

(65) Prior Publication Data

US 2004/0205289 A1 Oct. 14, 2004

(51) Int. Cl.$^7$ .............................................. G11C 7/00
(52) U.S. Cl. ................................ 365/200; 365/185.09
(58) Field of Search ................................. 365/200, 201, 365/230.03, 185.09; 711/202

(56) References Cited

U.S. PATENT DOCUMENTS

| | | | |
|---|---|---|---|
| 5,581,723 A | 12/1996 | Hasbun et al. ............... 395/430 |
| 5,956,742 A | 9/1999 | Fandrich et al. ............. 711/103 |
| 6,130,837 A | * 10/2000 | Yamagami et al. .... 365/185.09 |
| 6,493,807 B1 | 12/2002 | Martwick .................... 711/163 |
| 6,646,931 B2 | * 11/2003 | Mizoguchi et al. ......... 365/200 |

OTHER PUBLICATIONS

U.S. Appl. No. 10/408,131, filed Apr. 7, 2003, Eilert et al.
"What is Flash Memory?". Intel Article, Oct. 2002. http://www.intel.com.
"Intel Flash Data Integrator User's Guide Version 5"; Jul. 2002, pp. 11–16 and 103–128. http://www.intel.com.

* cited by examiner

Primary Examiner—Tan T. Nguyen
(74) Attorney, Agent, or Firm—Trop, Pruner & Hu, P.C.

(57) ABSTRACT

In one embodiment of the present invention, a method includes initiating a reclaim operation on a dirty block of a block-alterable memory if less than a predetermined number of unmapped blocks exist in the block-alterable memory; and writing data into free space of a spare block of the block-alterable memory while the reclaim operation is occurring.

25 Claims, 4 Drawing Sheets

RECLAIMING BLOCKS IN A BLOCK-ALTERABLE MEMORY

BACKGROUND

Block-alterable memories, such as flash memories, are often used for applications in which non-volatility and programmability are desired. Flash memory is a high-speed electrically erasable programmable read-only memory (EEPROM) in which erasing and programming (i.e., writing) is performed on blocks of data.

Systems using block-alterable memories such as flash memory typically require the use of management software to interface to the memory. This software incorporates varying levels of data management to facilitate efficient memory usage. For example, the software commonly reserves one or more main array blocks to be used for manipulation of data. In the event that data is deleted within a block containing valid data, the valid data is copied to an erased block and the block containing dirty data is subsequently erased. This process is called reclaim. In reclaim operations, software chooses the block to be reclaimed and does the actual copying over of the data from the dirty block to the spare block and then erases the dirty block.

Users desire that block-alterable memories accurately store and retrieve data and operate quickly. Erasing and reclaiming blocks of such memories takes a relatively long time. A need exists for maximizing user perceived reliability and minimizing user perceived erase and reclaim times of block-alterable memories. Further, a need exists to perform such activities using hardware.

DETAILED DESCRIPTION

Figure 1:
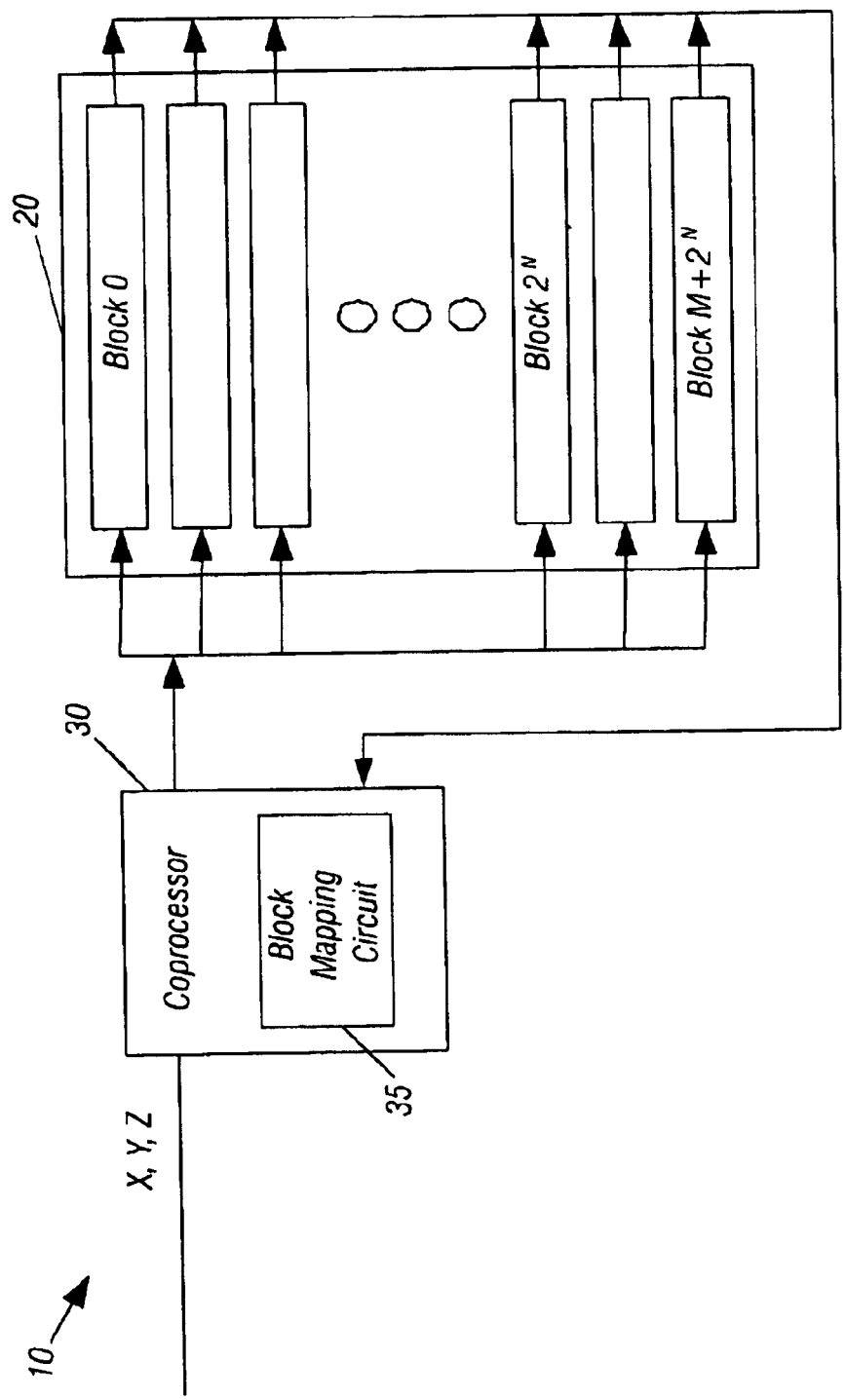
FIG. 1 is a block diagram of a block-alterable memory in accordance with one embodiment of the present invention.

Referring to FIG. 1, shown is a block diagram of a block-alterable memory in accordance with one embodiment of the present invention. As shown in FIG. 1, block-alterable memory 10, which may be a flash memory device, may include memory array 20 which includes a plurality of individual blocks. A block is a memory element that includes a number of rows and columns of memory cells. While the number of blocks in memory array 20 may vary, in certain embodiments featuring multi-level cells, 64 blocks may be present with each block of memory having 1 Megabytes (MB) of data storage, each of which may be separately erasable.

As further shown in FIG. 1, a coprocessor 30 may be coupled to memory array 20. Such a coprocessor may be used to perform various control activities for memory 10. In one embodiment, coprocessor 30 may be a stacked processor of a multi-chip memory system. As shown in FIG. 1, coprocessor 30 includes a block mapping circuit 35 which receives addressing information (e.g., a logical address) from a host system and provides an address to memory array 20 (e.g., a physical address). In certain embodiments, a host system may be, for example, a cellular telephone, personal digital assistant (PDA), laptop computer, or the like. In the embodiment of FIG. 1, a user address may include X address bits (i.e., row address bits), Y address bits (i.e., column address bits) and Z address bits (i.e., block address bits). However, in other embodiments other manners of addressing the memory device may be implemented.

As further shown in FIG. 1, in certain embodiments, coprocessor 30 may include a block mapping circuit 35 to provide a list of available blocks and a list of blocks that are in use. While not shown in FIG. 1, in various embodiments a write/erase control engine may be used to perform automated program and erase operations, such as to sequence high voltage signals needed for erase operations. Similarly, other peripheral circuits also may be present in memory 10.

In one embodiment of the present invention, a spare erased block may be logically substituted for a dirty block by underlying hardware (e.g., coprocessor 30), giving a user the perception that an erase operation occurs instantaneously. Dirty blocks may then be subsequently erased in the background. In certain embodiments, hardware may also perform wear-leveling, so that software does not need to add intelligence in choosing the block to be erased.

In various embodiments, initially all blocks of the block-alterable memory may be in a "free pool", and a block may be physically mapped in only when a write to that block occurs. In such manner, reclaims may occur much faster, since the erase takes place in the background. In these embodiments, the only overhead is in copying over valid data from the dirty block to the spare block.

In certain embodiments, it may be desirable to keep data compacted in a minimum number of blocks so that more empty blocks can be part of the free block pool, and can be mapped in on demand. Since reclaim time may reduce to the time required to copy valid data over to a new block, in certain embodiments it may be desirable to occasionally choose a dirty block over a free block for the next write. In such manner, data stays compacted in fewer data blocks, and allows more blocks to be in the "free pool" of blocks that can be swapped in when an erase is requested.

A block swap algorithm in accordance with an embodiment of the present invention may allocate a physical block to an address when the first write to that block takes place. Until then, a block is not mapped to that physical address range. As discussed above, to take advantage of this algorithm, a maximum number of blocks may be retained in the free pool, and data is not written to a block that does not yet need to be used.

In various embodiments, no status information is written to a block until that block is needed to store data. For example, when a memory device is formatted for the first time, no block information structure is written to a block until that block is physically allocated, that is, only when a new block is chosen to be written to, or when reclaim occurs. Such formatting may be performed, for example, by a wireless device manufacturer (e.g., an original equipment manufacturer (OEM)) when inserting a flash memory into a cellular phone or the like. Thus, a cellular phone or other device may leave the factory with substantially all blocks of its flash memory containing no status information, such as block information structure.

In one embodiment, the block information structure may include information regarding tracking of steps during a reclaim operation and information regarding logical to physical block mapping. Logical blocks that are not yet mapped to a physical block may be designated unmapped in a logical block table. In such an embodiment, erase count information need not be included in the block information structure, as hardware may take responsibility for wear-leveling.

Figure 2:
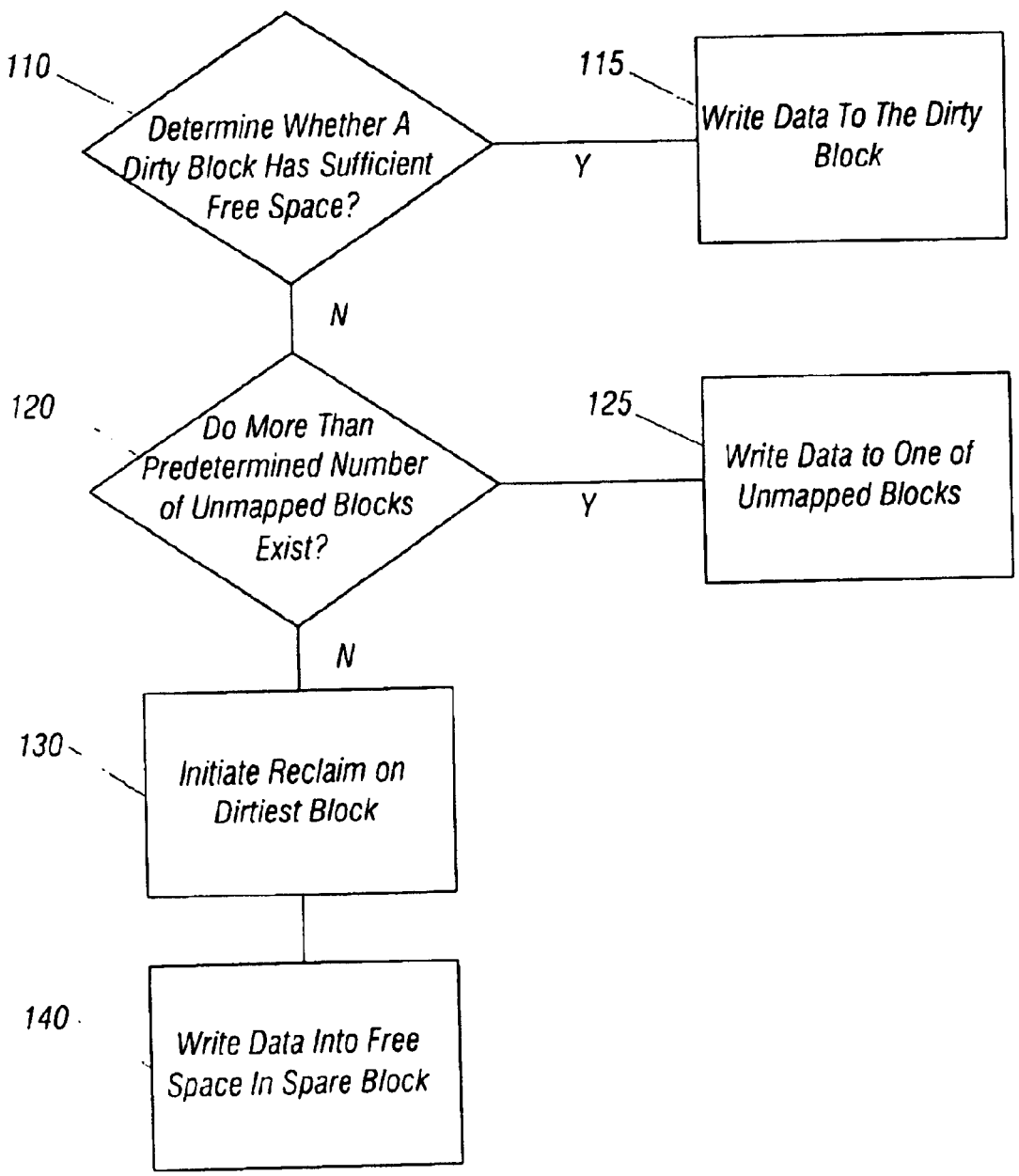
FIG. 2 is a flow diagram of a method in accordance with one embodiment of the present invention.

Referring now to FIG. 2, shown is a flow diagram of a method in accordance with one embodiment of the present invention. As shown in FIG. 2, the method may begin by determining whether a dirty block has sufficient free space to write a desired data portion (diamond 110). If such a dirty block exists, the data may be written to the block (block 115). In one embodiment, the data may be written to the dirtiest block having sufficient free space for the data portion.

Further shown in FIG. 2, if no dirty block exists having sufficient free space, it may then be determined whether more than a predetermined number of unmapped blocks exist in the memory array (diamond 120). While the number of such unmapped blocks may vary in different embodiments, in one embodiment the predetermined number may be three. That is, if more than three unmapped blocks exist, data may be written to one of the unmapped blocks (block 125).

If less than the predetermined number of unmapped blocks exists, a reclaim operation may be initiated on the dirtiest block in the memory array (block 130). However, in other embodiments the reclaim operation need not be performed on the dirtiest block. As described above, such a reclaim operation may include writing any valid data in the dirty block to a spare block. Additionally, the spare block may have certain status information contained therein modified. For example, its block information structure may be modified to include the logical address of the dirty block being reclaimed.

Further shown in FIG. 2, new data may be written into free space in the spare block (block 140). In one embodiment, such data may be written into free space in the spare block corresponding to address space where dirty data existed in the old block. The data may be written to the spare block during the process of copying over valid data from the dirty block to the spare block, in certain embodiments.

Figure 3:
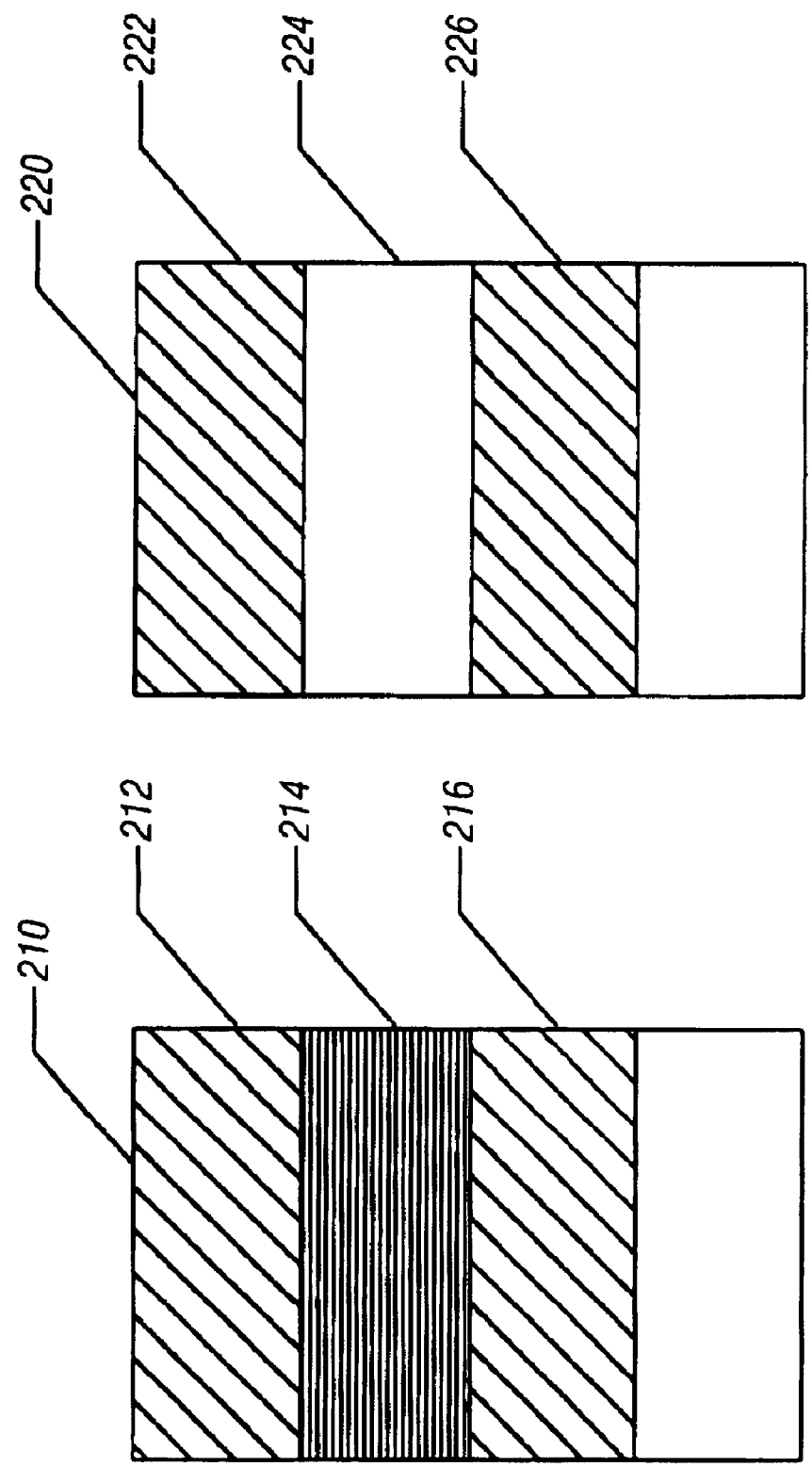
FIG. 3 is a block diagram of a reclaim operation on a block-alterable memory in accordance with one embodiment of the present invention.

Such a write during reclaim process is shown in FIG. 3. Referring now to FIG. 3, shown is a dirty block 210 which is desired to be reclaimed and a spare block 220. During the reclaim operation, valid data at locations 212 and 216 from the dirty block (i.e., reclaim block) 210 may be copied over to the spare block 220 at locations 222 and 226. As shown in FIG. 3, location 214 of the dirty block 210 contains dirty data. New data may be written during the reclaim operation (e.g., during copying of valid data at locations 212 and 216) to location 224 of the spare block 220. This location 224 may correspond to a location in dirty block 210 (e.g., location 214) which contains dirty data.

In the case of power loss, in some embodiments data that has been copied over and new data that has been written to the spare block may be appropriately coalesced during power loss recovery. For example, using a dynamic block swap a third block may be used to coalesce new data from the spare block and valid data from the reclaim block. In other words, upon power loss recovery valid data from the reclaim block may be copied to the third block along with new data from the spare block. Then, both the spare block and reclaim block may be erased.

In one embodiment, a dynamic block swap algorithm may be implemented in microcode of a flash memory device, for example, in a coprocessor within the device. In such an embodiment, software may pass a block back to the microcode with an erase command. The microcode algorithm may then perform an erase in the background. The microcode algorithm may then hold onto the erased block until a write to a specific block address occurs, at which time the algorithm may physically map a block from the erased pool on the write to a specific block address.

Certain embodiments may be used in connection with writing streaming data into a flash memory. Such writes may be performed much faster, since erases appear instantaneous, and overall performance as seen by the user may be much higher, because erases are a significant bottleneck in flash memories. In addition to streaming data, embodiments of the present invention may be used with any other storage of data in flash memory or other nonvolatile memory. For example, parameter/data storage in a cellular phone or file storage in a PDA may be significantly improved in certain embodiments.

Embodiments of the present invention may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, EEPROMs, magnetic or optical cards, or any type of media suitable for storing electronic instructions.

Figure 4:
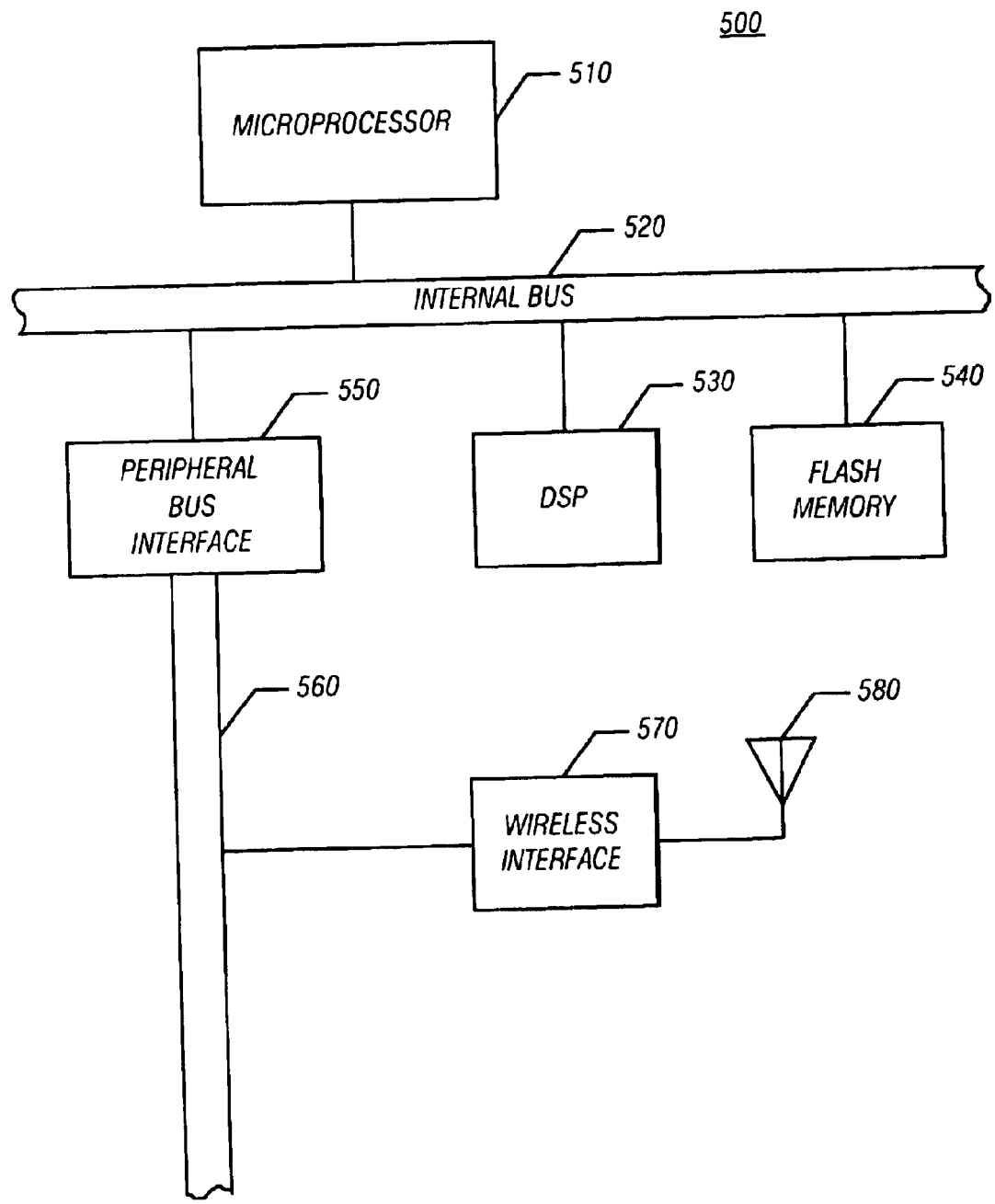
FIG. 4 is a block diagram of a wireless device with which embodiments of the present invention may be used.

FIG. 4 is a block diagram of a wireless device with which embodiments of the invention may be used. As shown in FIG. 4, in one embodiment wireless device 500 includes a processor 510, which may include a general-purpose or special-purpose processor such as a microprocessor, microcontroller, application specific integrated circuit (ASIC), a programmable gate array (PGA), and the like. Processor 510 may be coupled to a digital signal processor (DSP) 530 via an internal bus 520. A flash memory 540 may be coupled to internal bus 520, and may execute reclaim operations in accordance with an embodiment of the present invention, and may also include the memory array having the blocks to be reclaimed.

As shown in FIG. 4, microprocessor device 510 may also be coupled to a peripheral bus interface 550 and a peripheral bus 560. While many devices may be coupled to peripheral bus 560, shown in FIG. 4 is a wireless interface 570 which is in turn coupled to an antenna 580. In various embodiments antenna 580 may be a dipole antenna, helical antenna, global system for mobile communication (GSM) or another such antenna.

Although the description makes reference to specific components of device 500, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   initiating a reclaim operation on a dirty block of a block-alterable memory if less than a predetermined number of unmapped blocks exist in the block-alterable memory; and writing data into a first portion of a spare block of the block-alterable memory while the reclaim operation is occurring.

2. The method of claim 1, wherein initiating the reclaim operation comprises initiating the reclaim operation on a dirtiest block of the block-alterable memory.

3. The method of claim 1, further comprising determining whether the predetermined number of unmapped blocks exists.

4. The method of claim 1, wherein the reclaim operation comprises copying valid data from the dirty block to the spare block.

5. The method of claim 4, wherein the reclaim operation further comprises erasing the dirty block in a background operation.

6. The method of claim 5, further comprising erasing the dirty block using a processor located in the block-alterable memory.

7. The method of claim 1, wherein the predetermined number of unmapped blocks is at least three.

8. The method of claim 1, wherein the first portion of the spare block comprises a memory location where dirty information resided in the dirty block.

9. A method comprising:
   maintaining a plurality of blocks of a formatted block-alterable memory in an unallocated state, the plurality of blocks in the unallocated state being clear of status information.

10. The method of claim 9, wherein the formatted block-alterable memory comprises a flash memory.

11. The method of claim 9, further comprising selecting one of the plurality of blocks as a spare block.

12. The method of claim 11, further comprising writing new data to the spare block during a reclaim operation.

13. The method of claim 12, further comprising coalescing the new data with valid data of a reclaim block in a third block.

14. The method of claim 13, further comprising erasing the reclaim block and the spare block.

15. An article comprising a machine-readable storage medium containing instructions that if executed enable a system to:
   initiate a reclaim operation on a dirty block of a block-alterable memory if less than a predetermined number of unmapped blocks exist in the block-alterable memory.

16. The article of claim 15, further comprising instructions that if executed enable the system to write data into free space of a spare block of the block-alterable memory while the reclaim operation is occurring.

17. The article of claim 15, further comprising instructions that if executed enable the system to wear level the block-alterable memory.

18. A system comprising:
   at least one storage device to store code to maintain a plurality of blocks of a formatted block-alterable memory in an unallocated state, the plurality of blocks in the unallocated state being clear of status information; and
   a dipole antenna coupled to the at least one storage device.

19. The system of claim 18, further comprising a coprocessor coupled to the at least one storage device to perform the code.

20. The system of claim 19, wherein the coprocessor comprises a stacked processor of multi-level flash memory.

21. The system of claim 18, wherein the at least one storage device comprises a plurality of blocks, at least some of the plurality of blocks being clear of status information.

22. An apparatus comprising:
   at least one storage device to store code to initiate a reclaim operation on a dirty block of a block-alterable memory if less than a predetermined number of unmapped blocks exist in the block-alterable memory.

23. The apparatus of claim 22, further comprising second code to write data into free space of a spare block of the block-alterable memory while the reclaim operation is occurring.

24. The apparatus of claim 22, wherein the at least one storage device comprises a flash memory.

25. The apparatus of claim 24, further comprising a coprocessor coupled to the flash memory to perform the code.

* * * * *